United States Patent
Vialen et al.

(10) Patent No.: US 7,089,023 B2
(45) Date of Patent: Aug. 8, 2006

(54) PAGING CONTROL METHOD AND APPARATUS

(75) Inventors: Jukka Vialen, Espoo (FI); Tuomo Flytström, Helsinki (FI)

(73) Assignee: Nokia Corporation, Espoo (FI)

( * ) Notice: Subject to any disclaimer, the term of this patent is extended or adjusted under 35 U.S.C. 154(b) by 1179 days.

(21) Appl. No.: 09/824,938

(22) Filed: Apr. 3, 2001

(65) Prior Publication Data

US 2002/0019241 A1 Feb. 14, 2002

Related U.S. Application Data

(63) Continuation of application No. PCT/EP98/06360, filed on Oct. 6, 1998.

(51) Int. Cl.
*H04Q 7/20* (2006.01)

(52) U.S. Cl. .................... 455/458; 455/426.1
(58) Field of Classification Search ............. 455/458, 455/426.1, 426.2, 445, 517, 461
See application file for complete search history.

(56) References Cited

U.S. PATENT DOCUMENTS 5,745,695 A 4/1998 Gilchrist et al. ........... 709/227
6,230,009 B1 5/2001 Holmes et al. ............. 455/426
2003/0092439 A1 * 5/2003 D'Herbemont et al. ..... 455/426

FOREIGN PATENT DOCUMENTS

| DE | 196 11 947 | 6/1997 |
| EP | 750 439 | 12/1996 |
| WO | WO 96/09712 | 3/1996 |
| WO | WO 99/53704 | 10/1999 |
| WO | WO 00/27154 | 5/2000 |

* cited by examiner

*Primary Examiner*—Lee Nguyen
*Assistant Examiner*—Un Cho
(74) *Attorney, Agent, or Firm*—Squire, Sanders & Dempsey LLP

(57) ABSTRACT

A paging method and apparatus for a mobile communication network to which at least two non-coordinated core networks are connected is disclosed, wherein a service state of a mobile station is checked, when a request for a paging message to the mobile station has been received from one of the non-coordinated core networks. Then, a multicall paging message is transmitted using an existing signalling link of the mobile station and/or mobile station location information known in a radio access network, when the mobile station is already connected to another one of the non-coordinated core networks. The checking is preferable performed by a radio network controller which is connected to the non-coordinated core networks. Thus, a paging request received form a non-coordinated core network can be supplied to a mobile station, although the paged mobile station is already connected to another non-coordinated core network.

18 Claims, 3 Drawing Sheets

PAGING CONTROL METHOD AND APPARATUS

This application is a continuation of international application serial number PCT/EP98/06360, filed Oct. 6, 1998.

FIELD OF THE INVENTION

The present invention relates to a paging control method and apparatus for a mobile communication network, such as a UTRAN (UMTS Radio Access Network) system, to which at least two non-coordinated core network nodes, such as an SGSN (Serving GPRS Support Node) of the GPRS (General Packet Radio Service) and an MSC (Mobile Switching Center) of the GSM (Global System for Mobile Communications) or their equivalents in the UMTS (Universal Mobile Telecommunications System), are connected.

BACKGROUND OF THE INVENTION

A paging system is a one-way (wireline to mobile) digital transmission system. Message paging systems will grow with evolution of electronic-mail services, wherein the message communication hardly interrupts the person being called.

A mobile station (MS) of a mobile communication system has three states, i.e. idle, standby, and active. Data can be transmitted between the mobile station and the mobile communication network only when the mobile station is in the active state. In the active state, the cell location of the mobile station is known to the mobile communication network.

Looking at the MS-UTRAN level, an MS basically has only two service states (in the following referred to as UTRAN service states) seen from the higher layer perspective, namely idle and RRC connected. The RRC connected state has further substates that are not visible to the higher layers and/or core network entities. These substates are based on the current channel allocation situation and are called Dedicated Channel (DCH) Active state and Common Channel state. The MS is moved between these two states (and within the substates of these two states, explained below) based on the data activity level of the MS.

The DCH Active state is further divided into two substates based on the type of radio bearer to which a dedicated channel is currently allocated and are called User Data Active state and Control Only state.

The Common Channel state is further divided into two substates based on the accuracy at which an MS location is known in the UTRAN, which is also directly related to the type of downlink common channel which can be used to communicate to the MS. These substates are called RACH/FACH state and RACH/PCH state.

The RACH/PCH state is further divided into two substates based on the accuracy at which the MS location is known within this state. These states are called Single Cell PCH state and URA (UTRAN Registration Area) state.

In the idle state, the MS does not have a logical network context activated or any corresponding addresses allocated. In this state, the MS can only receive multi cast messages which can be received by any MS. Since the mobile communication network does not know the location of the MS, it is not possible to send messages to the MS from external networks.

If multiple non-coordinated core networks are connected to one radio access network (such as UTRAN) of the mobile communication network and one of the core networks has an active connection with an MS, while a "non-active" core network starts paging towards the MS, a special procedure is required to transfer the paging message to the mobile station, because the MS normally does not listen to a paging channel during the active state.

In a GSM-GPRS system, only class-A mobile stations (capable of simultaneously listening both GSM and GPRS control channels) can be paged, if a Gs interface between a Mobile Switching Center (MSC) and an SGSN (Serving GPRS Support Node) is missing. If the Gs interface exists and the MS is attached to the GPRS, it can be paged from the circuit-switched side (GSM) using GPRS channels. If a GPRS data channel is active, the circuit-switched paging can be routed via that data channel.

However, no solution has been proposed so far as to a paging control method to be performed if a circuit-switched call is active and a paging request arrives from a non-coordinated packet-switched network.

Also, for the UMTS system, where only one set of control channels in UTRAN are available even if two independent core network entities are connected to the same UTRAN, a novel method is required for the paging control.

SUMMARY OF THE INVENTION

It is therefore an object of the present invention to provide a paging control method and apparatus which allow paging from a non-coordinated network to an active mobile station.

This object is achieved by a paging control method for a mobile communication network to which at least two non-coordinated core networks are connected, comprising the steps of:
checking a service state of a mobile station, when a request for a paging message to said mobile station has been received from one said of non-coordinated core networks; and
transmitting a multicall paging message using an existing signaling link and/or mobile station location information known in a radio access network, when said mobile station is already connected to another one of said non-coordinated core networks.

Additionally, the above object is achieved by a paging control apparatus for a mobile communication network to which at least two non-coordinated core networks are connected, comprising:
means for checking a service state of a mobile station, when a request for a paging message to said mobile station has been received from one said of non-coordinated core networks; and
means for transmitting a multicall paging message using an existing signaling link and/or mobile station location information known in a radio access network, when said mobile station is already connected to another one of said non-coordinated core networks.

Accordingly, by performing the above checking step, an existing RRC connection can be determined and used for transmitting a multicall paging message to the mobile station. Thereby, the paging request can be transmitted to the mobile station despite of its active state. Generally, it is to be understood that the multicall paging message is different from a normal paging message used to page a mobile station in the idle mode and different from a packet paging message used to find a mobile station in the standby state, i.e. RACH/PCH state in the current UMTS terminology.

The checking step is preferably performed by a radio network controller of said mobile communication network by determining whether said mobile station has already an RRC connection, wherein a normal paging operation using a PCH channel is performed, when the mobile station has no RRC connection. Thus, the checking step can be performed in an easy manner, since the RNC merely has to check the provision of an RRC connection to the paged mobile station.

The checking step naturally also requires that the RNC can associate the possibly different MS identities used by the two independent core network entities for paging the same MS. There are at least two methods how this can be achieved. Either in the core network—RNC interface a common identification (id) is always added to the paging request (e.g. IMSI) or the MS tells the RNC all possible paging identities.

The multicall paging message preferably can be transmitted on a channel selected in accordance with the UTRAN service state of the mobile station. In case the mobile station is in a DCH Active state, the multicall paging message can be transmitted on a dedicated channel and may contain an information defining a requested bearer, a page mode and a core network identity.

In case a mobile station is in an RACH/FACH state, the multicall paging message can be transmitted on an FACH channel. If the mobile station is in an RACH/PCH state, the multicall paging message can be transmitted on a PCH channel.

In case of the above RACH/FACH state of the mobile station, the multi call paging message may preferably contain an information defining a requested bearer, a core network identification and a page mode. It is to be noted that no MS identity is required in this state even if the message is sent on a common downlink channel (FACH), since the inband identification of the MS is included in the header of a lower layer message carrying the multicall paging message.

In case of the above RACH/PCH state of the mobile station, the multicall paging message may preferably contain an information defining a requested bearer, a core network identification, a page mode and a radio network temporary identity (RNTI).

The mobile station preferably checks the possibility of creating the requested bearer and responds with a multicall paging response message comprising an information as to whether the requested bearer can be created, or not, and an appropriate protocol information.

Thus, all necessary informations for performing the requested paging can be exchanged between the radio access network and the mobile station, such that the radio network controller of the radio access network may transmit a paging response to the requesting non-coordinated core network entity.

BRIEF DESCRIPTION OF THE DRAWINGS

In the following, the present invention will be described in greater detail on the basis of a preferred embodiment with reference to the accompanying drawings in which.

DESCRIPTION OF THE PREFERRED EMBODIMENT

In the following, a preferred embodiment of the paging control method according to the present invention will be described on the basis of a mobile communication system such as a UMTS system when the radio access network (UTRAN) is connected to a GPRS based core network and to a GSM based core network.

Figure 1:
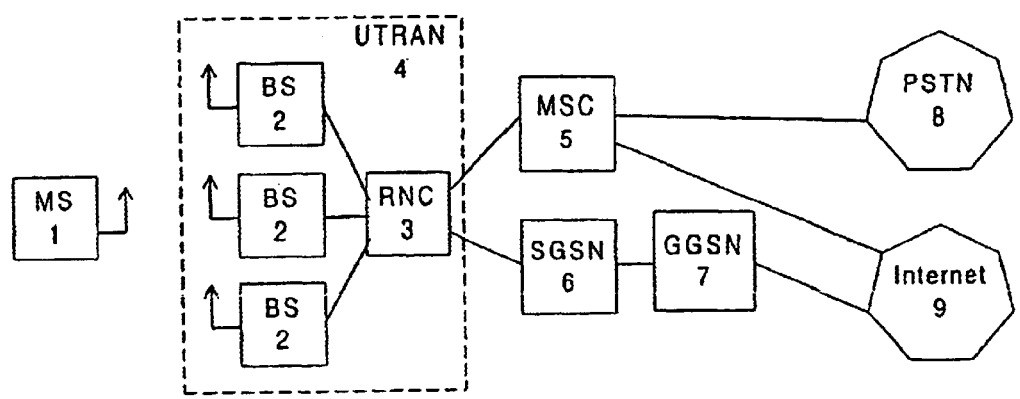
FIG. 1 shows a principle block diagram of a mobile communication network connected to a circuit-switched network and a packet-switched network.

According to FIG. 1, a mobile station (MS) 1 is radio-connected to at least one Base Station (BS) 2 which is connected to a Radio Network Controller (RNC) 3 of the UTRAN. In CDMA based systems, the MS 1 can be connected to several BS 2 simultaneously due to macrodiversity.

The RNC 3 is connected to a Mobile Switching Center (MSC) 5 of the UMTS or GSM core network which provides access to a circuit-switched network such as a Public Switched Telephone Network (PSTN) 8 or to a packet-switched network such as the Internet 9.

Additionally, the RNC 3 is connected to an SGSN 6 of the UMTS or GPRS core network. The SGSN 6 is connected to a Gateway GPRS Support Note (GGSN) which provides access to the Internet 9.

Thus, the RNC 3 is connected to two non-coordinated core networks which may both establish an active connection with the MS 1.

In the following two cases are described with reference to FIGS. 2 and 3, wherein one of the above core networks has an active connection with the MS 1 and the other core network starts paging towards the MS 1.

Figure 2:
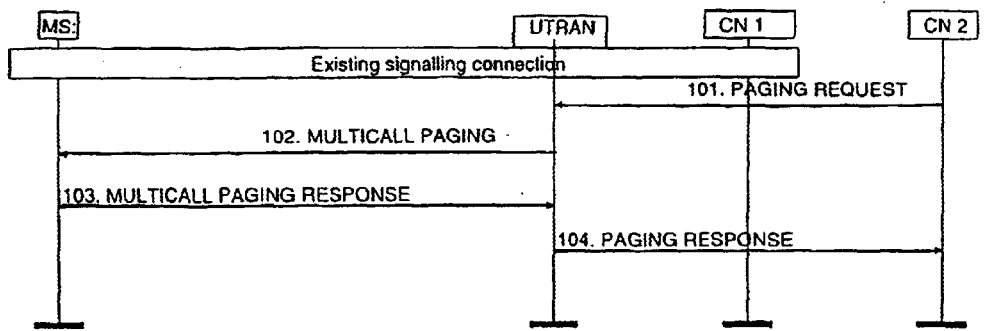
FIG. 2 shows a principal diagram indicating a paging information flow according to the preferred embodiment of the present invention, if a paged mobile station has already at least a signaling connection with a core network CN1.

FIG. 2 shows a principal diagram indicating a paging information flow according to the preferred embodiment of the present invention, if a paged mobile station has already at least a signaling connection with a core network CN1, which can be e.g. a GPRS core network or a GPRS based packet-switched UMTS core network or any other packet-switched UMTS core network or a GSM core network or a GSM based circuit-switched UMTS core network or any other circuit-switched UMTS core network.

According to FIG. 2, a signaling connection between the MS 1 and the CN1 entity (e.g. SGSN 6) is established via the UTRAN. The RNC 3 in the UTRAN receives a paging request 101 from a CN2 entity (e.g. MSC 5) of a second core network CN2. Having received the paging request 101 from the CN2 entity, the RNC 3 detects that the paged MS 1 has already an RRC connection (in this case due to the signaling connection with the CN1). Thus, the RNC 3 transmits a multicall paging message 102 to the MS 1 by using the existing RRC connection.

Having received the multicall paging message, the MS 1 responds with a multicall paging response comprising an information e.g. as to the possibility of creating a bearer requested by the RNC 3. Accordingly, the MS 1 may reject the paging request, if it has no capacity or capability to create the requested bearer.

Having received the multicall paging response 103 from the MS 1, the RNC 3 transmits a corresponding paging response 104 to the requesting CN2 (e.g. MSC 5).

Therefore, a paging request from a non-coordinated core network can be transmitted to the MS 1, although the state of the MS 1 is not visible to the core network entity.

Figure 3:
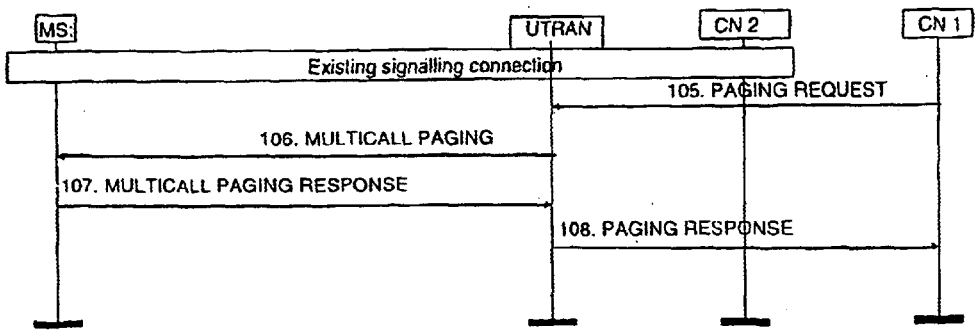
FIG. 3 shows a principal diagram indicating a paging information flow according to the preferred embodiment of the present invention, if a paged mobile station has already at least a signaling connection with a core network CN 2.

FIG. 3 shows a principal diagram indicating a paging information flow according to the preferred embodiment of the present invention, if a paged mobile station has already at least a signaling connection with a core network CN 2 which can be e.g. a GPRS core network or a GPRS based packet-switched UMTS core network or any other packet-switched UMTS core network or GSM core network of GSM based circuit-switched UMTS core network or any other circuit-switched UMTS core network.

According to FIG. 3, a signaling connection between the MS 1 and the CN2 entity (e.g. MSC 5) is established via the UTRAN. The RNC 3 in the UTRAN receives the paging request 105 from the CN1 entity (e.g. SGSN 6). Having received the paging request from the CN1, the RNC 3 detects that the paged MS 1 has already an RRC connection (in this case due to the signaling connection with CN2). Thus, the RNC 3 transmits a multicall paging message 106 to the MS 1 by using the existing RRC connection.

Having received the multicall paging message, the MS 1 responds with a multicall paging response 107 comprising an information e.g. as to the possibility of creating a bearer requested by the RNC 3. Accordingly, the MS 1 may reject the paging request, if it has no capacity or capability to create the requested bearer.

Having received the multicall paging response 107 from the MS 1, the RNC 3 transmits a corresponding paging response 108 to the requesting CN1 (e.g. SGSN 6).

In the following, the paging control performed by the RNC 3 is described in more detail with reference to FIG. 4.

Figure 4:
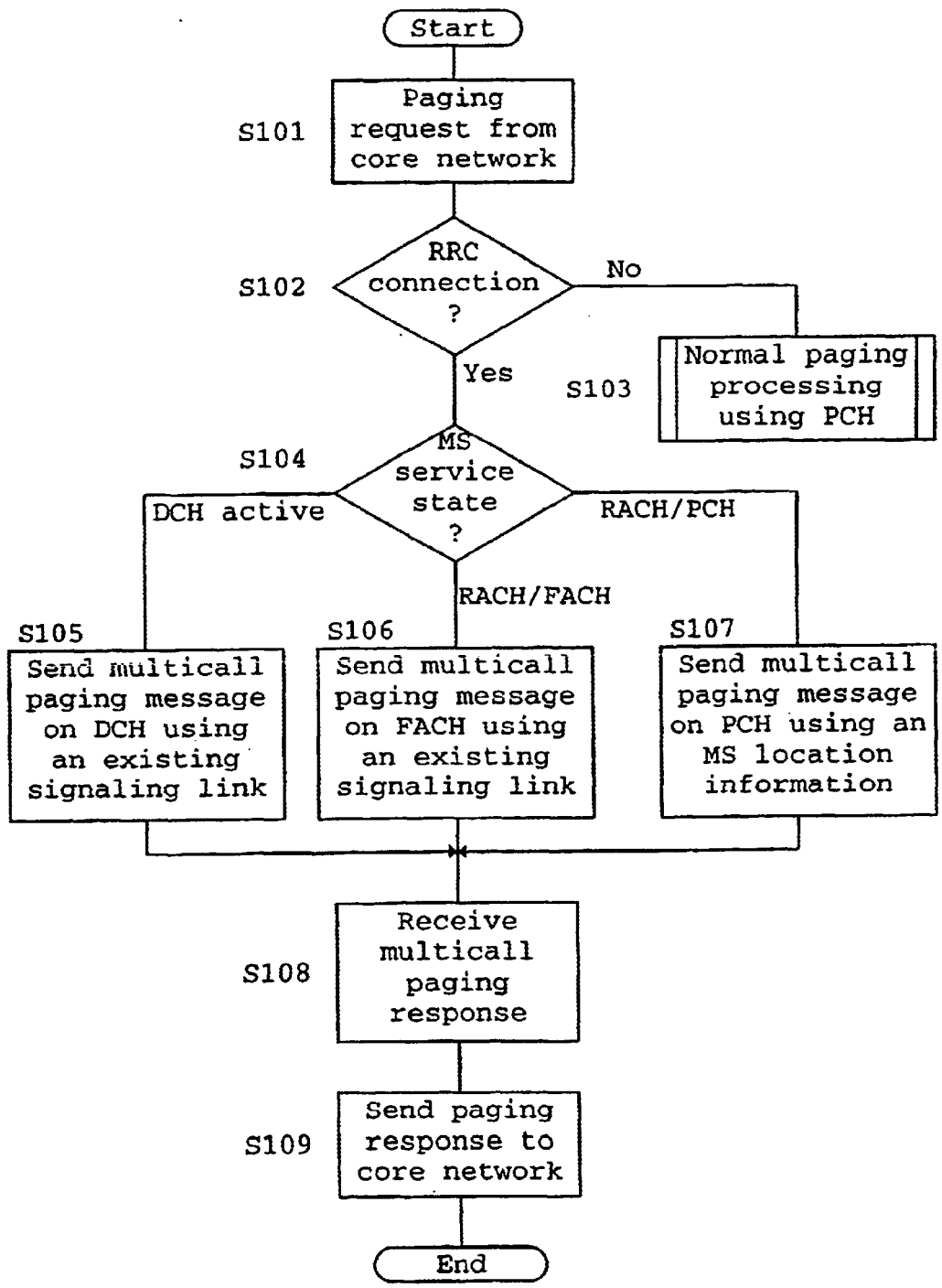
FIG. 4 shows a flow diagram of a paging control method according to the preferred embodiment of the present invention.

According to FIG. 4, the RNC 3 receives a paging request from the MSC 5 or the SGSN 6 in step S101. Subsequently, the RNC 3 checks in step S102 if the paged MS 1 has already an RRC connection. If the MS 1 does not have an RRC connection, then a normal paging processing with a usual paging message via the paging channel PCH will be performed in step S103.

In case an RRC connection exists for the paged MS 1, the RNC 3 determines the service state of the paged MS 1 in step S104, in order to determine the channel on which the multicall paging message will be transmitted and the information contained in the multicall paging message.

If the determined service state indicates a DCH Active state, the RNC3 transmits a multicall paging message on the dedicated channel DCH using the existing signaling link (step S105). In this case, the multicall paging message contains parameters defining a requested bearer, an identification of the requesting core network and page mode.

It is to be noted that the signaling link is a layer 2 connection between the MS 1 and the RNC 3 and provides an acknowledged mode service to transfer a higher layer information, e.g. the multicall paging message or the multicall paging response message. The signaling link can be used in the DCH state and the RACH/FACH state but not in the RACH/PCH state.

If the determined service state indicates a Random Access Channel (RACH) and Forward Link Access Channel (FACH) state, the RNC 3 transmits a multicall paging message on the fast associated channel FACH using the existing signaling radio bearer (step S106). In this case, the multicall paging message includes parameters indicating the requested bearer, the identification of the requesting core network and page mode. In addition, the multicall paging message may include parameters defining a dedicated channel which the MS 1 must start using for signaling. In this case, the MS 1 switches to the indicated DCH and leaves the RACH/FACH state.

In case the service state indicates a Random Access Channel (RACH) and Paging Channel (PCH) state, the RNC 3 transmits a multicall paging message on the paging channel PCH using the location information of the MS 1 which is known by the RNC 3 (step S107). In particular, this means that the multicall paging message can be sent either via one cell or via cells belonging to an UTRAN registration area where the MS 1 is currently located. In this case, the multicall paging message includes parameters indicating the requested bearer, the identification of the requesting core network, a page mode and a Radio Network Temporary Identity (RNTI) which is allocated by the RNC 3 and which exists during the lifetime of an RRC connection and can be changed during the connection, e.g. due to serving an RNC relocation. The RNTI replaces the MS identifier used in "normal" paging messages.

In all of the above mentioned cases (DCH Active, RACH/FACH, RACH/PCH), the location information (e.g. cell list) provided by the core network to the UTRAN in the paging request message does not need to be used by the UTRAN at all, since the existing RRC connection already provides the required location information to the UTRAN. In most cases, the MS location known by the UTRAN during the RRC connections is more accurate than the location known in the core network level.

When the MS 1 receives the multicall paging message, it checks if it can create the requested bearer indicated in the multicall paging message. If the MS 1 has no capacity to create the requested bearer, it rejects the paging request. Otherwise, it admits the paging request. Subsequently, the MS 1 responds to the multicall paging message received from the RNC 3 with a multicall paging response message which includes information about whether the requested bearer can be created, or not, and the appropriate MM (Mobility Management) protocol information. In addition, the multicall paging response message may contain an information related only to the UTRAN, e.g. an UTRAN specific MS classmark information.

The RNC 3 receives the multicall paging response message in step S108 and transmits a corresponding paging response message the requesting core network (step S109).

In summary, a paging control method and apparatus for a mobile communication network to which at least two non-coordinated core networks are connected is disclosed, wherein a service state of a mobile station is checked in a radio access network, when a request for a paging message to the mobile station has been received from one of the non-coordinated core networks. Then, a multicall paging message is transmitted using an existing signaling link and/or mobile station location information known in the radio access network, when the mobile station is already connected to another one of the non-coordinated core networks. The checking is preferably performed by a radio network controller which is connected to the non-coordinated core networks. Thus, a paging request received from a non-coordinated core network can be transferred to a mobile station, although the paged mobile station is already connected to another non-coordinated core network.

It should be understood that the above description of the preferred embodiment and the accompanying drawings are only intended to illustrate the present invention. Thus, the paging control method according to the present invention may also be used in other mobile communication systems. Furthermore, the preferred embodiment of the invention may vary within the scope of the attached claims.

What is claimed is:

1. A paging control method for a mobile communication network to which at least two non-coordinated core networks are connected, comprising the steps of:
   a) checking a service state of a mobile station; when a request for a paging message to said mobile station has been received from one of said non-coordinated core networks; and
   b) transmitting a multicall paging message using an existing signaling link and/or mobile station location information known in a radio access network, when said mobile station is already connected to another one of said non-coordinated core networks.

2. A paging control method according to claim 1, wherein said checking step is performed by a radio network controller of said mobile communication network by determining whether said mobile station has already a connection, wherein a normal paging operation by using a paging channel is performed, when the mobile station has no connection.

3. A paging control method according to claim 1, wherein said multicall paging message is transmitted on a channel selected in accordance with the service state of said mobile station.

4. A paging control method according to claim 3, wherein said multicall paging message is transmitted on a dedicated channel, when said mobile station is in a dedicated channel active state.

5. A paging control method according to claim 4, wherein said multicall paging message contains an information defining a requested bearer, a page mode and a core network identification.

6. A paging control method according to claim 5, wherein said mobile station checks a possibility of creating the requested bearer and responds with a multicall paging response message comprising an information as to whether the requested bearer can be created, or not, and an appropriate protocol information.

7. A paging control method according to claim 3, wherein said multicall paging message is transmitted on an FACH channel, when said mobile station is in an RACH/FACH state.

8. A paging control method according to claim 7, wherein said multicall paging message includes an information defining a requested bearer, a core network identification and a page mode.

9. A paging control method according to claim 8, wherein said multicall paging message includes an information defining a dedicated channel which said mobile station has to start using for signaling.

10. A paging control method according to claim 3, wherein said multicall paging message is transmitted on a PCH channel, when the mobile station is in an RACH/PCH state.

11. A paging control method according to claim 10, wherein said multicall paging message includes an information defining a requested bearer, a core network identification and a radio network temporary identity.

12. A paging control apparatus for a mobile communication network to which at least two non-coordinated core networks (5, 6) are connected, comprising:
    a) means (3) for checking a service state of a mobile station (1), when a request for a paging message to said mobile station (1) has been received from one said of non-coordinated core networks (5, 6); and
    b) means (3) for transmitting a multicall paging message using an existing signaling link and/or mobile station location information known in a radio access network, when said mobile station is already connected to another one of said non-coordinated core networks.

13. A paging control apparatus according to claim 12, wherein said paging control apparatus comprises a radio network controller (3) of said mobile communication system.

14. A paging control apparatus according to claim 12, wherein said non-coordinated core networks comprise a GSM-GPRS core network with no Gs interface between a Mobile Switching Center (5) and a Serving GPRS Support Node (6).

15. A paging control apparatus according to claim 12, wherein said mobile communication networks comprise a GSM network.

16. A paging control apparatus according to claim 12, wherein said non-coordinated core networks comprise a GSM network, a GPRS network, a GSM based UMTS, a GPRS based UMTS or any other circuit- and/or packet-switched core network nodes.

17. A paging control apparatus according to claim 16, wherein said one of said non-coordinated core networks comprises a mobile switching center (5) and wherein said other one of said non-coordinated core networks comprises a Serving GPRS Support Node (6), or vice versa.

18. A paging control apparatus according to claim 17, wherein said mobile switching center is a GSM based UMTS mobile switching center and wherein said Serving GPRS Support Node is a GPRS based UMTS SGSN.

* * * * *